US 8,506,455 B2

(12) United States Patent
Cowett

(10) Patent No.: US 8,506,455 B2
(45) Date of Patent: Aug. 13, 2013

(54) EXERCISE MAT WITH INTEGRATED AUDIO

(76) Inventor: Alexei J. Cowett, Arlington, VA (US)

( * ) Notice: Subject to any disclaimer, the term of this patent is extended or adjusted under 35 U.S.C. 154(b) by 0 days.

(21) Appl. No.: 12/845,255

(22) Filed: Jul. 28, 2010

(65) Prior Publication Data

US 2011/0105178 A1    May 5, 2011

Related U.S. Application Data

(60) Provisional application No. 61/229,030, filed on Jul. 28, 2009.

(51) Int. Cl.
*A63B 24/00*    (2006.01)

(52) U.S. Cl.
USPC ......... 482/8; 482/1; 482/9; 434/247; 434/250

(58) Field of Classification Search
USPC ................. 482/1–9, 900–902; 434/247, 250, 434/365
See application file for complete search history.

(56) References Cited

U.S. PATENT DOCUMENTS

| 5,971,761 | A | * | 10/1999 | Tillman, Sr. | 434/81 |
| 6,114,645 | A | * | 9/2000 | Burgess | 200/512 |
| 6,905,413 | B1 | * | 6/2005 | Terao et al. | 463/40 |
| 7,490,379 | B2 | * | 2/2009 | Solomon et al. | 5/655 |
| 7,870,625 | B2 | * | 1/2011 | Omar | 5/655 |
| 7,959,521 | B2 | * | 6/2011 | Nusbaum et al. | 473/278 |
| 8,002,283 | B1 | * | 8/2011 | Jones | 273/354 |
| 2009/0156308 | A1 | * | 6/2009 | Hsu | 463/39 |
| 2010/0016125 | A1 | * | 1/2010 | Bellandi | 482/4 |
| 2011/0195392 | A1 | * | 8/2011 | Kim | 434/365 |

* cited by examiner

*Primary Examiner* — Glenn Richman
(74) *Attorney, Agent, or Firm* — Greenberg Traurig, LLP

(57) ABSTRACT

In an embodiment, the invention provides an exercise mat, which may be of flexible polymer foam material and which includes one or more speakers integrated thereinto. An audio interface is further integrated into the material of the mat and is configured to receive an audio signal from at least one audio source, and to output an amplified audio signal to the speakers.

14 Claims, 1 Drawing Sheet

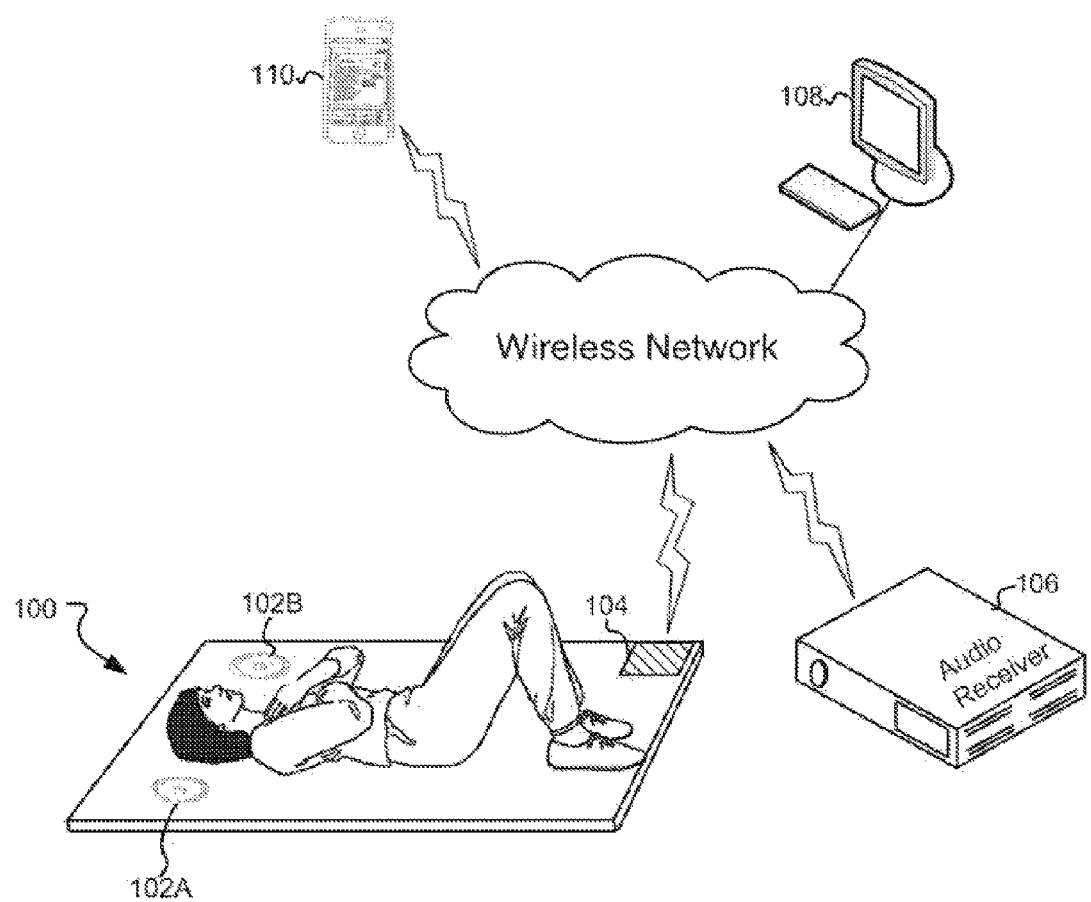

EXERCISE MAT WITH INTEGRATED AUDIO

This application claims priority to U.S. Provisional Patent Application No. 61/229,030 filed Jul. 28, 2009, the entire disclosure of which is incorporated herein by reference. This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present invention relates to the field of workout/exercise mats used in gymnasiums and other workout areas.

BRIEF DESCRIPTION OF THE DRAWINGS

The objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

FIG. 1 shows a schematic block diagram illustrating feature of the invention in accordance with one embodiment.

SUMMARY

In an embodiment, the invention provides an exercise mat, which may be of flexible polymer foam material and which includes one or more speakers integrated thereinto. An audio interface is further integrated into the material of the mat and is configured to receive an audio signal from at least one audio source, and to output an amplified audio signal to the speakers.

DETAILED DESCRIPTION

Reference will now be made in detail to the preferred embodiments of the present invention, examples of which are illustrated in the accompanying drawings.

The present invention is described below with reference to block diagrams and operational illustrations of methods and devices to provide an exercise mat with integrated audio features. It is understood that each block of the electronic blocks or operational illustrations, and combinations of blocks in the block diagrams or operational illustrations, may be implemented by means of analog or digital hardware and computer program instructions. These computer program instructions may be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

FIG. 1 shows a wireless embodiment of the system of the present invention. The system includes a polymer foam exercise mat 100 with integrated audio components. The polymer foam mat 100 may be, e.g., polyurethane foam sandwiched between two outer layers of resilient polymer or rubber material. The mat is of a size which is suitable for use as an exercise mat, e.g., larger than 24" by 36". Speaker drivers 102A, 102B are embedded into the mat. The speaker drivers 102, 102B may be conventional rigid speakers as used in conventional loudspeakers, or may be flexible speakers.

The exercise mat 100 includes an audio interface 104, which is also embedded into the mat. The audio interface may comprise a wireless interface, such as a BlueTooth, Wi-Fi, infrared, or RF interface. The audio interface 104 may also comprise a wired interface, such as a ⅛ inch stereo pin jack. The audio interface includes an amplifier sufficient for driving the speaker drivers 102A, 102B. A volume control may be provided on the mat 100, such as in the audio interface 104. The audio interface 104 may be powered by an external power supply or, optionally, by internal batteries. The speakers 102A, 102B, the audio interface 104, and the volume control may be made water resistant or waterproof. The audio interface 104, the volume control, and any other controls may be located at the head of the mat, the foot of the mat, in the center of the mat, or any location which will provide accessibility to the user while not interfering with usage of the mat for its intended purpose, e.g., exercise.

The audio interface 104 receives audio source material, either wirelessly or via a cable connection, from one or more audio sources 106, 108, 110, and outputs an amplified stereo analog signal to the speaker drivers 102A, 102B. The audio sources 106, 108, 110 may comprise, e.g., a portable media player such as an iPod or MP3 player, smart phone, a stereo receiver, a media server, a personal computer, a gaming system, a digital audio jukebox, FM radio, satellite radio, or other known audio source. If the audio source is a smart phone, the mat may be configured to provide speakerphone functionality by incorporating a speakerphone circuit into the audio interface 104 and incorporating a microphone into the mat 100. In such embodiments, the speakerphone circuit can be configured to wirelessly receive audio from the audio source(s) and also to wirelessly send audio from the microphone to the audio source(s).

Among the many benefits of the present invention is that it provides a means for interaction between a user and a fitness instructor. This is particularly useful in a group exercise scenario, where each participant needs to hear the instructor clearly. The invention is also useful in a scenario where a user is performing exercises in accordance with recorded audio instructional material or music, from an iPod or other source.

Sensors in the mat or worn by the user may be used to determine whether a user is following instructions and/or exercising efficiently. The sensors may be calibrated based on weight, height, body type, user input, and/or other factors.

While the invention has been particularly shown and described with reference to a preferred embodiment thereof, it will be understood by those skilled in the art that various changes in form and details may be made therein without departing from the spirit and scope of the invention.

The invention claimed is:
1. An exercise mat, comprising:
  a flexible mat of a size suitable for use as an exercise mat;
  at least one speaker integrated into said flexible mat;
  an audio interface integrated into said flexible mat and configured to receive an audio signal from at least one audio source external to the exercise mat and to output an amplified audio signal to the at least one speaker, wherein said audio interface comprises a speakerphone circuit.

2. The exercise mat in accordance with claim 1, wherein said flexible mat comprises a polymer foam mat.

3. The exercise mat in accordance with claim 2, wherein said flexible polymer foam mat comprises polyurethane foam sandwiched between two outer layers of resilient polymer or rubber material.

4. The exercise mat in accordance with claim 3, wherein at least one of the two outer layers is a water-resistant layer.

5. The exercise mat in accordance with claim 1, wherein said at least one speaker comprises a flexible speaker.

6. The exercise mat in accordance with claim 1, wherein said audio interface is configured to wirelessly receive said audio signal via a bluetooth interface.

7. The exercise mat in accordance with claim 1, wherein said audio interface is configured to wirelessly receive said audio signal via a WiFi interface.

8. The exercise mat in accordance with claim 1, wherein said audio interface is configured to wirelessly receive said audio signal via a radio-frequency interface.

9. The exercise mat in accordance with claim 1, further comprising a volume control for controlling a level of audio output through said at least one speaker.

10. The exercise mat according to claim 1, wherein the speakerphone circuit is configured to wirelessly receive audio from the audio source and also to wirelessly send audio from a microphone to the audio source.

11. The exercise mat in accordance with claim 1, wherein said audio interface is configured to receive said audio signal via a wire.

12. The exercise mat in accordance with claim 1, further comprising sensors in the mat or worn by the user, said sensors being configured to determine whether a user is following instructions and/or exercising efficiently.

13. The exercise mat in accordance with claim 1, further comprising a microphone incorporated into the mat.

14. The exercise mat in accordance with claim 1, wherein said speakerphone circuit comprises a wireless interface.

* * * * *